US012656143B2

(12) United States Patent
Dave et al.

(10) Patent No.: US 12,656,143 B2
(45) Date of Patent: Jun. 16, 2026

(54) ADAPTIVE CLASSIFICATION OF ELECTRIC VEHICLE CHARGING LOCATION USING CONNECTED VEHICLE DATA

(71) Applicant: Ford Global Technologies, LLC, Dearborn, MI (US)

(72) Inventors: Devang Bhalchandra Dave, Ann Arbor, MI (US); Kavita Kawlra, Rochester Hills, MI (US); Rekha Khandhadia, Troy, MI (US)

(73) Applicant: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 18/333,537

(22) Filed: Jun. 13, 2023

(65) Prior Publication Data

US 2024/0418527 A1 Dec. 19, 2024

(51) Int. Cl.
| | |
|---|---|
| *G01C 21/36* | (2006.01) |
| *G01C 21/34* | (2006.01) |
| *G06F 18/23* | (2023.01) |

(52) U.S. Cl.
CPC ..... *G01C 21/3682* (2013.01); *G01C 21/3469* (2013.01); *G01C 21/3617* (2013.01); *G06F 18/23* (2023.01)

(58) Field of Classification Search
CPC ............ G01C 21/3682; G01C 21/3469; G01C 21/3617; G06F 18/23
See application file for complete search history.

(56) References Cited

U.S. PATENT DOCUMENTS

| | | | |
|---|---|---|---|
| 2016/0328661 A1* | 11/2016 | Reese | ..................... G06N 3/044 |
| 2017/0308948 A1 | 10/2017 | Chikkannanavar et al. | |
| 2024/0193626 A1* | 6/2024 | Cancino | ............. G06Q 30/0202 |

FOREIGN PATENT DOCUMENTS

| | | |
|---|---|---|
| CN | 111861022 A | 10/2020 |
| JP | 2015034751 A | 2/2015 |
| KR | 101676689 B1 | 11/2016 |
| WO | 2017028333 A1 | 2/2017 |

OTHER PUBLICATIONS

Jinyang Li et al., Planning Electric Vehicle Charging Stations Based on User Charging Behavior, University of Science and Technology of China, May 28, 2018, 1-12.

* cited by examiner

*Primary Examiner* — Adnan M Mirza
(74) *Attorney, Agent, or Firm* — Emily Campbell; Eversheds Sutherland (US) LLP

(57) ABSTRACT

A method for providing an electric vehicle charging recommendation is disclosed. The method may include obtaining information associated with a plurality of charging events for a vehicle. The information may include a plurality of vehicle geolocations associated with the plurality of charging events. The method may further include generating a plurality of charging geolocation clusters from the plurality of vehicle geolocations. The method may additionally include determining a charging event occurrence frequency for each charging geolocation cluster. Further, the method may include classifying the charging geolocation clusters into a primary charging station location and routine charging station locations. Furthermore, the method may include defining a virtual polygon connecting the primary charging station location and the routine charging station locations, and transmitting the electric vehicle charging recommendation to a server based on the defined virtual polygon.

20 Claims, 5 Drawing Sheets

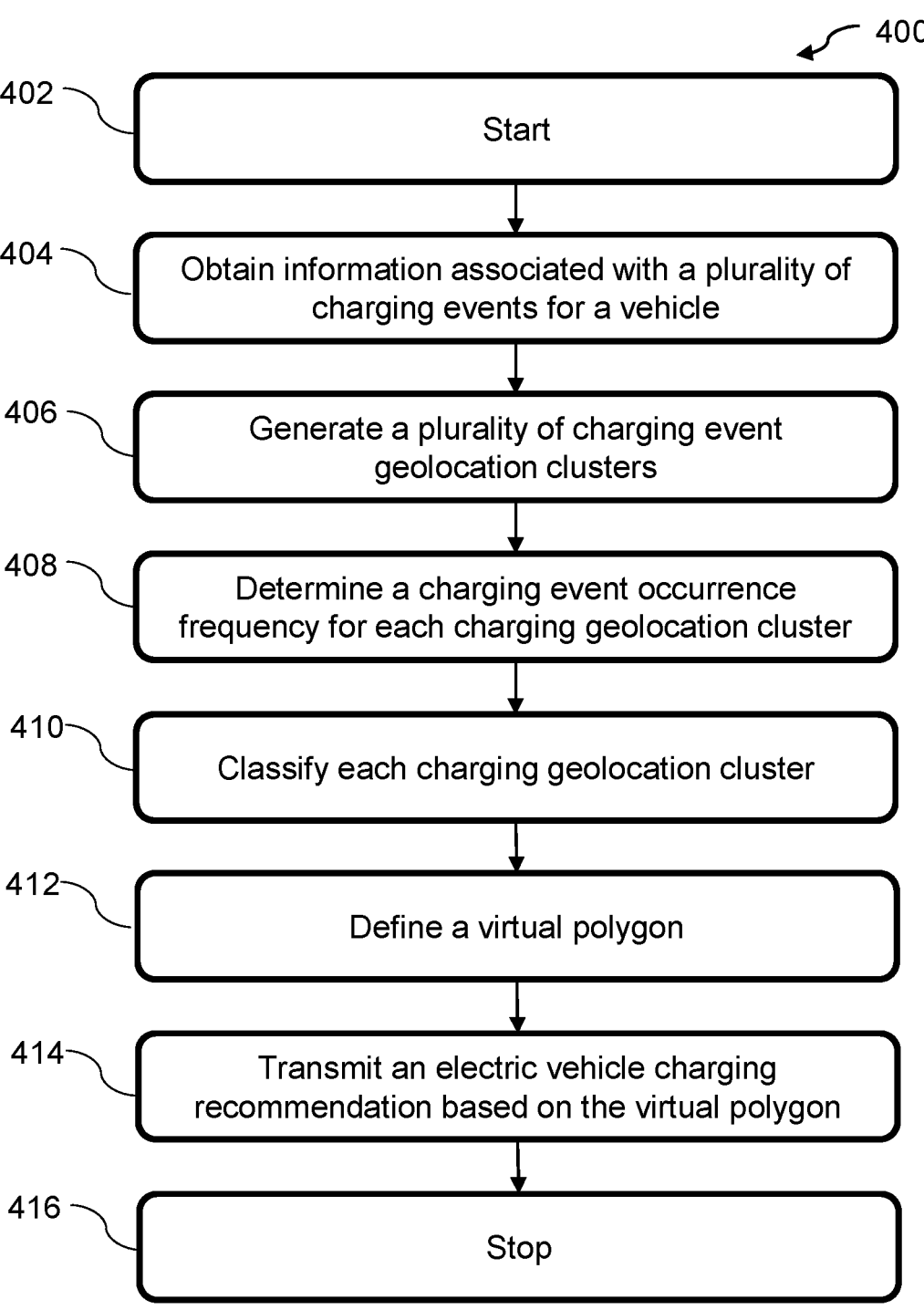

400

402   Start

404   Obtain information associated with a plurality of charging events for a vehicle 406   Generate a plurality of charging event geolocation clusters 408   Determine a charging event occurrence frequency for each charging geolocation cluster 410   Classify each charging geolocation cluster 412   Define a virtual polygon 414   Transmit an electric vehicle charging recommendation based on the virtual polygon 416   Stop

FIG. 4

ADAPTIVE CLASSIFICATION OF ELECTRIC VEHICLE CHARGING LOCATION USING CONNECTED VEHICLE DATA

FIELD

The present disclosure relates to adaptive classification of electric vehicle (EV) charging locations and more particularly to systems and methods for providing EV charging recommendations based on classification of EV charging locations using connected vehicle data.

BACKGROUND

An Electric Vehicle (EV) operates on electric energy and a vehicle user is required to charge vehicle battery regularly to ensure uninterrupted vehicle operation. The user may charge the vehicle battery using EV chargers located at user's home, workplace, and/or public charging stations. User's convenience of operating the EV may considerably increase when EV charging infrastructure is easily accessible.

Knowing customer charging patterns and behaviors is important for entities operating EV chargers and/or planning to build new charging infrastructure. However, information associated with charging patterns for a diverse set of customers may not be readily available or may not be accurate. Lack of reliable information may result in incorrect and/or delayed infrastructure related decisions.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 4 depicts a flow diagram of an example EV charging recommendation method in accordance with the present disclosure.

DETAILED DESCRIPTION

Overview

Figure 1:
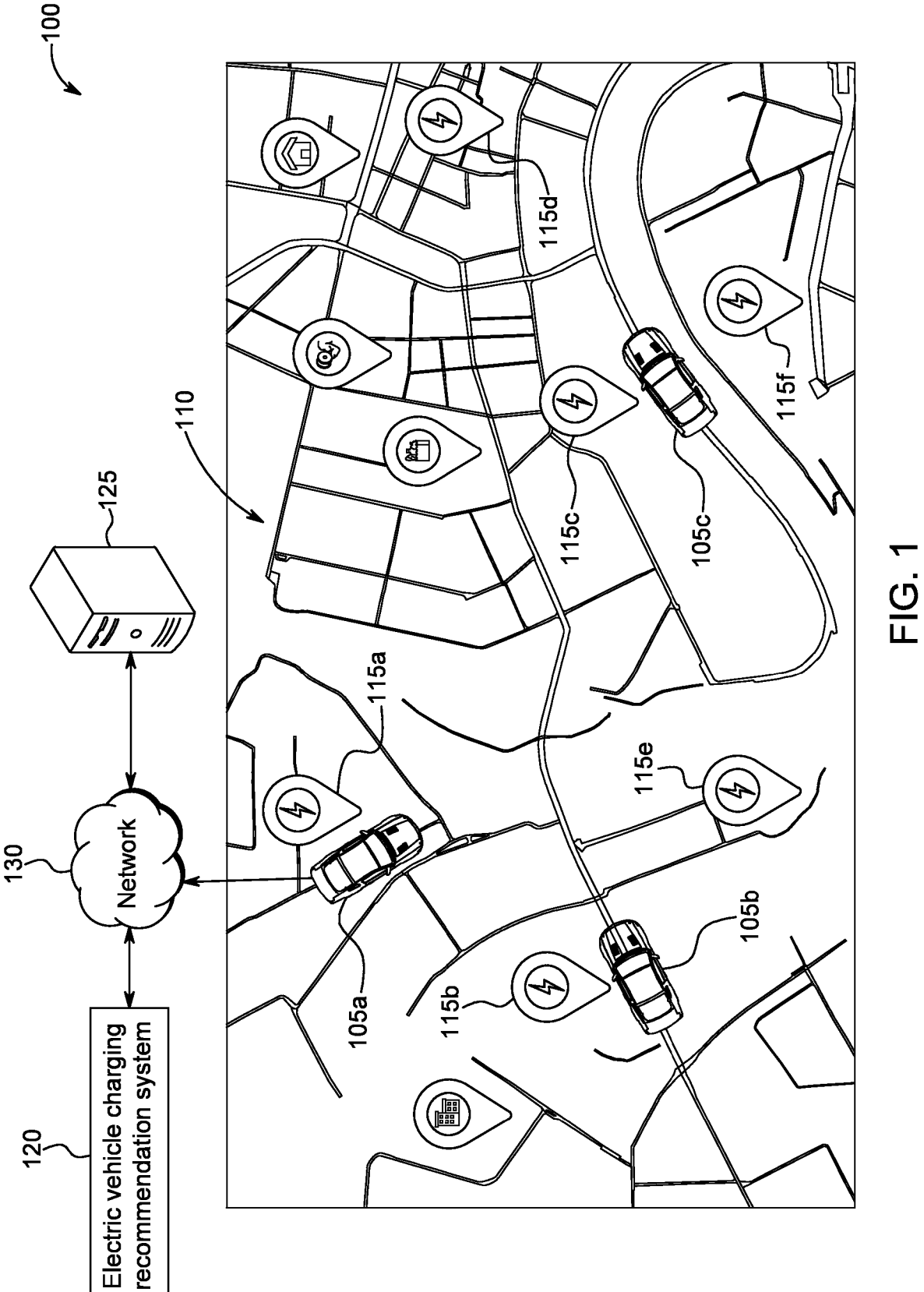
FIG. 1 depicts an example environment in which techniques and structures for providing the systems and methods disclosed herein may be implemented.

The present disclosure describes an electric vehicle (EV) charging recommendation system that may provide charging recommendations to entities that may be operating a plurality of EV charging stations and/or planning to build new EV charging infrastructure. The recommendations may be associated with optimum locations on a road network where the new EV charging infrastructure may be built and/or one or more incentives that may be provided to vehicle uses to enhance usage of existing EV charging stations.

The system may obtain information associated with a plurality of charging events from a vehicle over a predefined time duration and may determine a plurality of charging station locations where the vehicle may have been charged during the time duration. The information may include vehicle geolocations and timestamps associated with each charging event. The system may determine frequency of charging event occurrences at each charging station location and may classify the plurality of charging station locations into different categories based on charging event occurrence frequencies. For example, the system may classify charging station locations with associated charging event occurrence frequencies greater than a predefined threshold as "routine" charging station locations and a charging station location having a maximum charging event occurrence frequency from the "routine" charging station locations as "primary" charging station location. The primary charging station location may be a charging station location where the vehicle may be charged the most, and the routine charging station locations may be charging station locations where the vehicle may be charged often. In some aspects, the system may provide higher weights to charging events that may have occurred "recently" as compared to "historical" charging events when the system classifies the charging station locations.

In further aspects, the system may define a virtual polygon on a virtual map of a geographical area connecting the primary charging station location and the routine charging station locations. The virtual polygon may indicate a "daily driving area" associated with the vehicle. The system may classify one or more charging station locations located within the virtual polygon as "nearby" charging station locations. The nearby charging station locations may indicate the charging station locations that may be within the daily driving area associated with the vehicle; however, the vehicle may not be charged often at the nearby charging station locations. The system may further classify one or more charging station locations located outside the virtual polygon as short or long trip charging station locations.

The system may aggregate virtual polygons and associated charging station location classifications for a plurality of vehicles over the predefined time duration and may determine EV charging recommendations based on the aggregated information. For example, the system may determine a recommendation to build new EV charging infrastructure at locations that may be disposed a predefined distance from the short or long trip charging station locations. As another example, the system may determine a recommendation to provide incentives (e.g., discounts, coupons, subscription, etc.) to vehicle users who may use the nearby charging station locations for charging their vehicles to enhance usage of nearby charging station locations. Responsive to determining the recommendations, the system may transmit the recommendations to one or more servers associated with the entities that may be managing existing EV charging infrastructure and/or planning to build new EV charging infrastructure.

The present disclosure discloses an electric vehicle charging recommendation system that provides EV charging infrastructure and/or incentive recommendations based on big data obtained from a plurality of vehicles. Since the system provides the recommendations based on data obtained directly from the vehicles, the recommendations are accurate and up-to-date. Further, since the system provides recommendations based on real-time data gather over a time duration (e.g., 3 months, 6 months, 1 year, etc.), the recommendations provide actionable insights to the entities managing the EV charging infrastructure, thus facilitating timely and informed decision making.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a plurality of vehicles (shown as a first vehicle 105*a*, a second vehicle 105*b*, and a third vehicle 105*c*) that may be battery electric vehicles (BEVs) or plug-in hybrid electric vehicles (PHEVs). Each vehicle 105*a-c* (or vehicle 105) may take the form of any passenger or commercial vehicle such as, for example, an off-road vehicle, a car, a crossover vehicle, a van, a minivan, a bus, a truck, etc. Further, the vehicle 105 may be a manually driven vehicle and/or may be configured to operate in partially or fully autonomous mode. Furthermore, the vehicle 105 may include a traction battery or battery pack ("vehicle battery," not shown) that may provide energy for vehicle propulsion. The vehicle battery may be charged by an external power source, for example, an electric vehicle (EV) charger.

The plurality of vehicles 105 may be travelling on a road network 110 that may include a plurality of EV charging stations (shown as EV charging stations 115*a-f*). Each EV charging station 115 (or EV charging stations 115) may include one or more EV chargers (not shown) using which a vehicle user may charge the vehicle 105. In some aspects, the EV charging stations 115 may be public charging stations that may be used by one or more vehicle users to charge their vehicles. For example, the EV charging stations 115 may be commercial EV charging stations, and/or may be charging stations/chargers located at malls, parking lots, gyms, offices, etc. In other aspects, one or more EV charging stations 115 may be personal charging stations that may be located at users' homes.

The environment 100 may further include an electric vehicle charging recommendation system 120 (system 120) and one or more server(s) 125. The system 120, the server(s) 125, and the plurality of vehicles 105 may communicatively couple with each other via one or more networks 130. The network(s) 130 illustrates an example communication infrastructure in which the connected devices discussed in various embodiments of this disclosure may communicate. The network(s) 130 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, the server(s) 125 may be part of a cloud-based computing infrastructure and may be associated with and/or include a Telematics Service Delivery Network (SDN) that provides digital data services to the plurality of vehicles 105 and other vehicles (not shown in FIG. 1) that may be part of a vehicle fleet. In additional aspects, the server(s) 125 may be associated with entities that may be operating one or more EV charging stations 115, and/or entities that may be planning to build new EV charging infrastructure on the road network 110. For example, the server(s) 125 may be associated with firms that may be planning to build new EV charging stations on the road network 110. In further aspects, the server(s) 125 may be associated with entities that may provide one or more incentives to the vehicle users who may use the EV charging stations 115 to charge the vehicles 105. For example, the server(s) 125 may be associated with entities that may provide discounts, subscriptions, coupons, etc. to the vehicle users to incentivize the users to use the EV charging stations 115 and/or one or more other facilities (e.g., coffee shops, restaurants, etc.) located on the road network 110.

The system 120 may be configured to provide EV charging recommendations to the entities associated with the server(s) 125 based on charging patterns of the plurality of vehicles 105. Specifically, the system 120 may obtain data associated with vehicle charging from each vehicle 105 (e.g., the vehicle 105*a*) over a predefined time duration, and may determine charging patterns for the vehicle 105*a*. The predefined time duration may be, for example, 1 month, 3 months, 6 months, 12 months, and/or the like. In some aspects, the system 120 may aggregate individual charging patterns for each vehicle 105*a*, 105*b*, 105*c*, and may then determine a consolidated charging pattern for the plurality of vehicles 105. The system 120 may provide EV charging recommendations to the entities associated with the server(s) 125 based on the consolidated charging pattern for the plurality of vehicles 105.

In some aspects, the system 120 may determine charging patterns for the vehicle 105*a* by determining frequency of usage of the EV charging stations 115 by the vehicle 105*a* user to charge the vehicle 105*a*. Responsive to determining the frequency of usage, the system 120 may classify the EV charge stations 115 into a "Primary" charging station, "Routine" charging stations, and "Nearby" charging stations based on the frequency of usage. For example, the system 120 may classify the charging stations 115*a*, 115*b*, 115*c* as "Routine" charging stations when frequency of usage associated with the charging stations 115*a*. 115*b*, 115*c* over a predefined time duration (e.g., 3 months) exceeds a first predefined threshold (e.g., more than 10 times). Classification of the charging stations 115*a*, 115*b*, 115*c* as "routine charging stations" may indicate that the user often charges the vehicle 105*a* at the charging stations 115*a*, 115*b*, 115*c*.

In an alternative aspect, the system 120 may classify the charging stations 115*a*, 115*b*, 115*c* as routine charging stations when frequency of usage associated with the charging stations 115*a*, 115*b*, 115*c* over a "recent" predefined time duration (e.g., 1 month or less than 3 months) exceeds a second predefined threshold (e.g., more than 5 times). In yet another aspect, the system 120 may provide more weight to "recent" frequency of usage (e.g., frequency over past 1 month or 2 months) as compared to "historical" frequency of usage (e.g., frequency over past 3 or more months) of the charging stations 115*a*, 115*b*, 115*c* while classifying the charging stations 115*a*, 115*b*, 115*c* as routine charging stations.

The system 120 may additionally classify a charging station (e.g., the charging station 115*a*) as the "primary" charging station from the charging stations 115*a*, 115*b*, 115*c* where the user may charge the vehicle 105*a* the most. The system 120 may further identify one or more charging stations (e.g., the charging station 115d) as "Nearby" charging stations that may be located in proximity to the routine charging stations, however the user may use the nearby charging station seldom. For example, the associated frequency of usage of the nearby charging stations may be less than a third predefined threshold (e.g., less than 2 times) over the predefined time duration (e.g., 3 months) or the recent predefined time duration (e.g., 1 month). In further aspects, the system 130 may classify additional charging stations (e.g., the charging stations 115e, 115f) as "long trip" or "short trip" charging stations based on a distance of the long trip/short trip charging station from the routine charging stations, and/or associated frequency of usage of the long trip/short trip charging station.

In some aspects, the system 120 may classify the EV charging stations 115 based on big data obtained from the vehicle 105a and by using one or more supervised or unsupervised machine learning algorithms operating based on a preset ruleset. Examples of machine learning algorithms include, but are not limited to, algorithms associated with Linear Classifiers (Logistic Regression, Naive Bayes Classifier), Nearest Neighbor, Support Vector Machines, Decision Trees, Boosted Trees, Random Forest, hidden Markov Model, and/or Neural Networks. The classification of each EV charging station 115 may evolve over time, as the system 120 obtains more real-time charging data from the vehicle 105a. Detailed process of classifying the EV charging stations 115 is described is conjunction with FIG. 2.

The system 120 may aggregate determined charging patterns (e.g., classification for the EV charging stations 115 for each vehicle 105a, 105b, 105c) for the plurality of vehicles 105, and may transmit EV charging recommendations to the server(s) 125 based on the aggregated charging patterns. Specifically, the system 120 may use EV charging station classifications to determine EV charging recommendations that the system 120 may transmit to the server(s) 125. In some aspects, the EV charging recommendations may include EV charging infrastructure related recommendations. For example, the system 120 may transmit a recommendation to the server(s) 125 (or entities associated with the server(s) 125) to build new EV charging infrastructure in a geographical area where a count of routine charging stations may be less than a first predefined count threshold. The system 120 may further transmit a recommendation to the server(s) 125 (or entities associated with the server(s) 125) to build new EV charging infrastructure in a geographical area where a count of long trip or short trip charging stations may be less than a second predefined count threshold.

In other aspects, the EV charging recommendations may include EV charging incentive related recommendations. For example, the system 120 may transmit a recommendation to the server(s) 125 (or entities associated with the server(s) 125) to provide incentives, e.g., discounts, coupons, etc., for usage of "nearby" charging stations and/or facilities (e.g., coffee shops, restaurants, etc.) located in proximity to the nearby charging stations, to incentivize vehicle users to use the nearby charging stations.

The entities associated with the server(s) 125 may use the recommendations provided by the system 120 to enhance usage frequency of existing EV charging stations on the road network 110 (e.g., by providing incentives), and/or identify optimum locations on the road network 110 to build new EV charging infrastructure.

Figure 2:
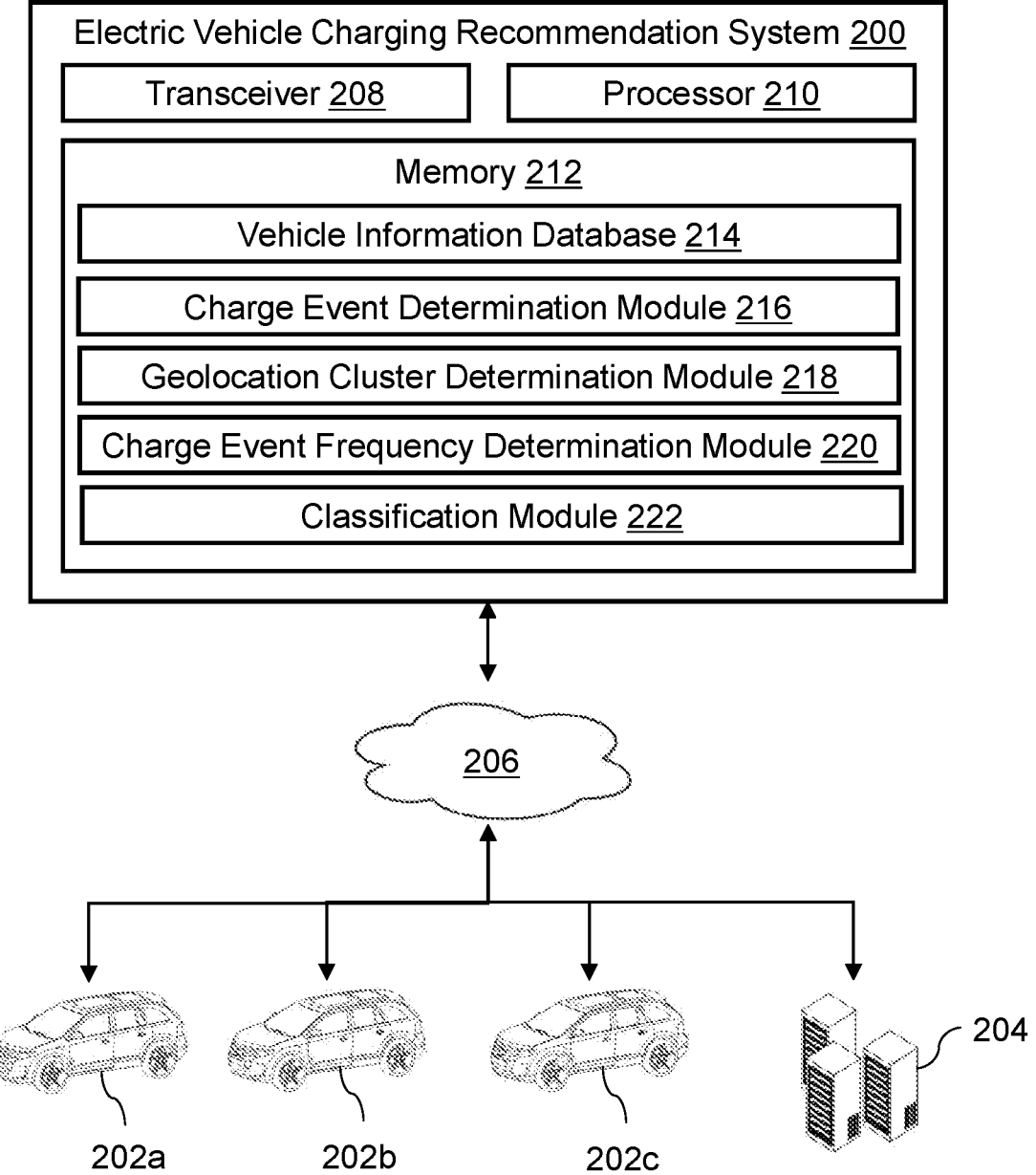
FIG. 2 depicts a block diagram of an example electric vehicle (EV) charging recommendation system in accordance with the present disclosure.

FIG. 2 depicts a block diagram of an example electric vehicle (EV) charging recommendation system 200 (system 200) in accordance with the present disclosure. While describing FIG. 2, references may be made to FIGS. 3A and 3B.

The system 200 may be same as the system 120. The system 200, as described herein, can be implemented in hardware, software (e.g., firmware), or a combination thereof. The system 200 may be connected with a plurality of vehicles 202 (shown as a first vehicle 202a, a second vehicle 202b, a third vehicle 202c) and one or more server(s) 204 via a network 206. In some aspects, the system 200 may be a part of the server(s) 204. In other aspects, the system 200 may be part of an external server (not shown) that may not be part of the server(s) 204. The vehicles 202 may be same as the vehicles 105, the server(s) 204 may be same as the server(s) 125, and the network 206 may be same as the network 130.

The system 200 may include a plurality of units including, but not limited to, a transceiver 208, a processor 210, and a memory 212. The transceiver 208 may be configured to transmit and receive information to and from the vehicles 202 and the server(s) 204, via the network 206.

The processor 210 may be an Artificial Intelligence (AI) based processor and may be disposed in communication with one or more memory devices, e.g., the memory 212 and/or one or more external databases (not shown in FIG. 2). The processor 210 may utilize the memory 212 to store programs in code and/or to store data for performing various system 200 operations in accordance with the present disclosure. The memory 212 may be a non-transitory computer-readable memory storing an EV charging recommendation program code. The memory 212 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The memory 212 may include a plurality of modules and databases including, but not limited to, a vehicle information database 214, a charge event determination module 216, a geolocation cluster determination module 218, a charging event frequency determination module 220, and a classification module 222. The modules 216, 218, 220, 222, as described herein, may be stored in the form of computer-executable instructions, and the processor 210 may be configured and/or programmed to execute the stored computer-executable instructions for performing system 200 functions in accordance with the present disclosure. Specifically, the modules 216, 218, 220, 222 may store computer-executable instructions associated with one or more supervised or unsupervised machine learning algorithms that may enable the processor 210 to perform system 200 functions. Examples of the machine learning algorithms are described in conjunction with FIG. 1.

In operation, the transceiver 208 may receive information associated with charging alerts or actions from each vehicle 202a, 202b, 202c, via the network 206. The information associated with charging actions may include, for example, timestamps and geolocations for one or more actions associated with the vehicles 202a, 202b, 202c. Examples of a charging action include, but are not limited to, a vehicle key-on action, a vehicle key-off action, an electric vehicle charger plug-in action, an electric vehicle charger plug-out action, a charging start action, a charging stop action, and/or the like.

The transceiver 208 may receive the information associated with a charging action from a vehicle (e.g., the vehicle 202*a*) whenever the corresponding action may be performed on the vehicle 202*a*. For example, the transceiver 208 may receive a timestamp and a vehicle geolocation associated with a charging start action when a user starts to the charge the vehicle 202*a* via an EV charging station (e.g., the charging station 115*a*). Similarly, the transceiver 208 may receive a timestamp and a vehicle geolocation associated with a charging stop action when the user stops to the charge the vehicle 202*a* via the charging station 115*a*.

Responsive to receiving the information associated with the charging actions from the vehicle 202*a*, the transceiver 208 may send the received information to the vehicle information database 214 for storage purpose. The processor 210 may obtain the information from the vehicle information database 214 (or directly from the transceiver 208), and may generate one or more "charging event" data structures or records based on the obtained information. A charging event record may indicate a single instance of vehicle charging performed on the vehicle 202*a*, and the processor 210 may generate the charging event record based on the obtained information and the instructions stored in the charge event determination module 216. Specifically, the processor 210 may correlate timestamps and vehicle geolocations of an electric vehicle charger plug-in action, a charging start action, an electric vehicle charger plug-out action and a charging stop action to create a single charging event record. For example, if a timestamp (and a vehicle geolocation) associated with the electric vehicle charger plug-in action is equivalent to a timestamp (and a vehicle geolocation) associated with the charging start action, the processor 210 may determine that the actions may be associated with a single charging event. Similarly, if a timestamp (and a vehicle geolocation) associated with the electric vehicle charger plug-out action is equivalent to a timestamp (and a vehicle geolocation) associated with the charging stop action, the processor 210 may determine that the actions may be associated with a single charging event. Furthermore, the processor 210 may determine that the charging start action and the charging stop action may be associated with a single charging event when the associated vehicle geolocations for the two actions may be same, and a difference between the associated timestamps is less than a predefined charging time threshold (which may be equivalent to a standard EV battery charge time duration).

In some aspects, the processor 210 may use the information associated with the charging actions, and may "stitch" together the actions (based on timestamps and/or vehicle geolocations) to determine one or more separate charging events associated with the vehicle 202*a*, as described above. Responsive to determining the separate charging events, the processor may create and store records for the charging events in the vehicle information database 214 as "charging event records" associated with the vehicle 202*a*. A charging event record may include a charging event time duration (e.g., a time duration between the charging start action and the charging stop action) and a charging event geolocation. The charging event geolocation may be determined using vehicle geolocation obtained from the vehicle 202*a*, and may indicate a location of an EV charger using which the user may have charged the vehicle 202*a*. A person ordinarily skilled in the art may appreciate from the description above that the charging event geolocation is determined by the processor 210 based on the vehicle geolocations associated with the charging actions obtained from the vehicle 202*a*.

In a similar manner as described above, the processor 210 may create (and store) charging event records for a plurality of charging events associated with the vehicle 202*a* over a predefined time duration. For example, the processor 210 may create charging event records for the vehicle 202*a* over a time duration of 1 month, 3 months, 6 months, 12 months, and/or the like. Each charging event record may include an associated charging event geolocation that may indicate a location of an EV charger that may have been used to charge the vehicle 202*a* for the charging event.

Responsive to generating/creating the charging event records, the processor 210 may use the instructions stored in the geolocation cluster determination module 218 and generate (or determine) a plurality of charging geolocation clusters based on the charging event geolocations associated with the plurality of charging events. In some aspects, the processor 210 may generate the plurality of charging geolocation clusters based on distances between the charging event geolocations. Specifically, the processor 210 may cluster or "combine" charging event geolocations that may be in proximity of each other (e.g., having a distance between the geolocations less than 250 meters) as a single charging geolocation cluster. For example, if the user uses two EV chargers that may be located at two separate edges of a parking lot (e.g., a right parking lot edge and a left parking lot edge that may be separated from each other by a distance of 200 meters) to charge the vehicle 202*a*, the processor 210 may "combine" geolocations of the two EV chargers into a single geolocation cluster.

In some aspects, to generate the charging geolocation clusters, the processor 210 may determine distances between each charging event geolocation, and may cluster those charging event geolocations together in a single cluster that may have distances between them less than a predefined threshold (e.g., 250 meters).

Figure 3A:
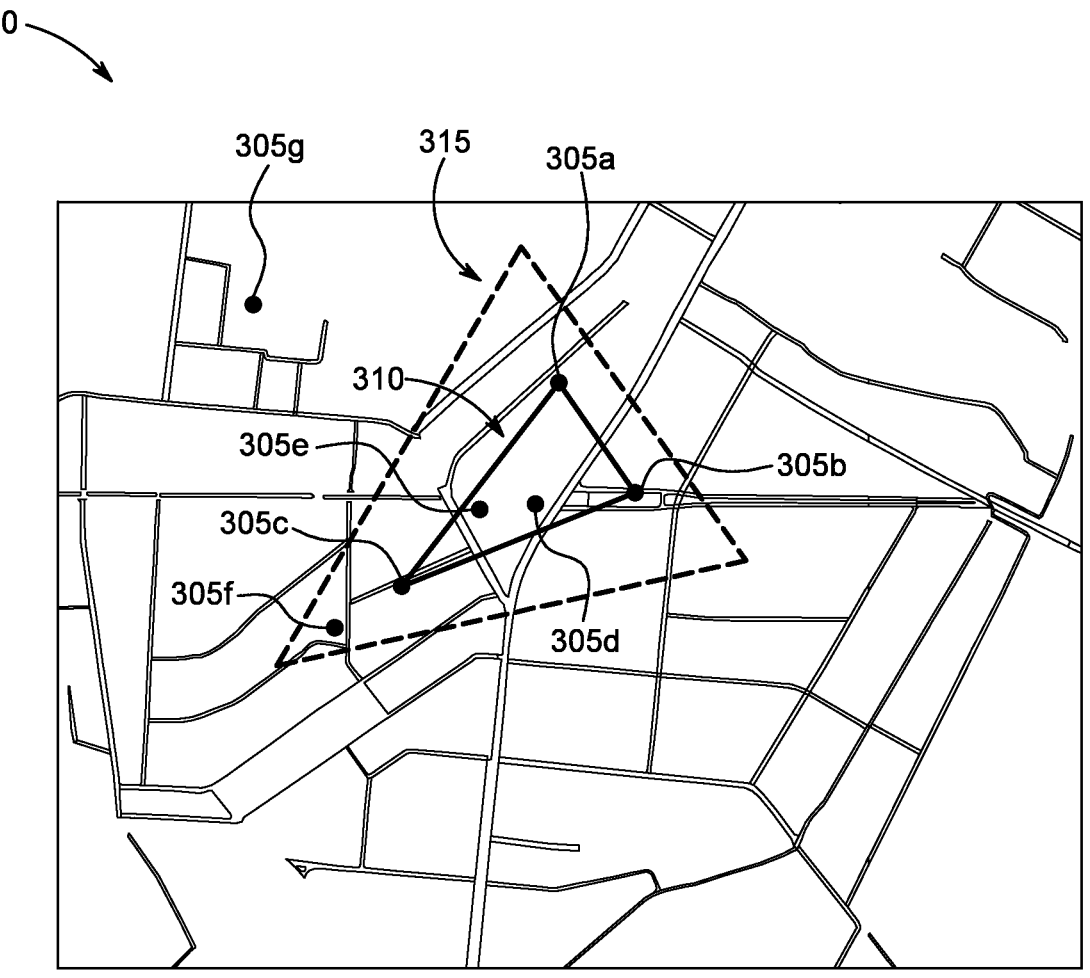
FIG. 3A depicts an exemplary virtual polygonal area in accordance with the present disclosure.
Figure 3B:
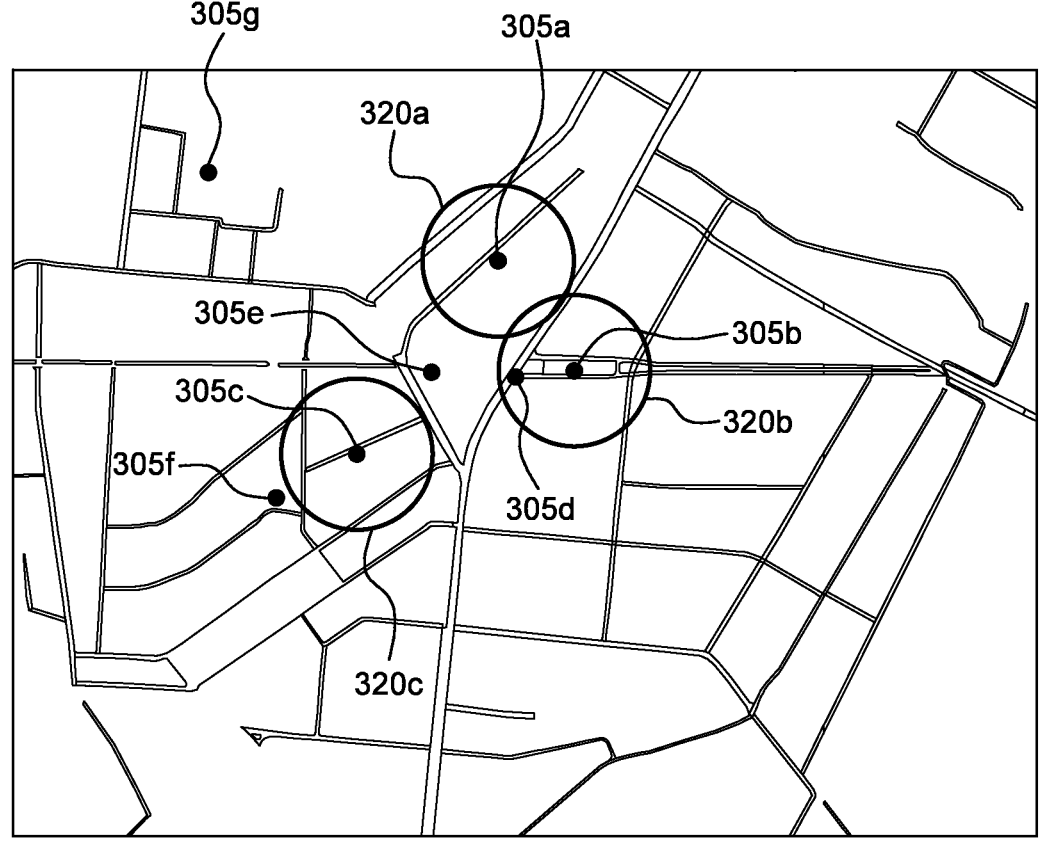
FIG. 3B depicts an exemplary virtual circular area in accordance with the present disclosure.

Examples of charging geolocation clusters are shown in FIGS. 3A and 3B. Specifically, FIGS. 3A and 3B depict a map of a geographical area 300, e.g., a city, a suburb, etc. The geographical area 300 may include a plurality of charging geolocation clusters 305*a-f* that may denote a plurality of charging station locations where the user may have charged the vehicle 202*a* over a period of 1 month, 3 months, 6 months, 12 months, and/or the like. Hereinafter, the charging geolocation clusters 305*a-f* are referred to as charging station locations 305*a-f*.

Responsive to determining the charging station locations 305*a-f*, the processor 210 may use the instructions stored in the charging event frequency determination module 220 to determine a charging event occurrence frequency for each charging station location 305*a-f*. The charging event occurrence frequency may indicate a count of charging events associated with the vehicle 202*a* that may have occurred in a specific charging station location. For example, if the user has charged the vehicle 202*a* eight times in past 3 months in the charging station location 305*a*, the charging event occurrence frequency for the charging station location 305*a* may be eight.

In some aspects, the processor 210 may determine the charging event occurrence frequency for a charging station location based on a linear count of charging events that may have occurred at the charging station location over a predefined time duration (e.g., 1 month, 3 months, 6 months, 12 months, and/or the like). In other aspects, the processor 210 may determine the charging event occurrence frequency for a charging station location based on a weighted count of charging events that may have occurred at the charging station location over a predefined time duration. In this case, the processor 210 may provide a higher weight to recent charging event occurrences (e.g., that may have occurred "recently" over the past 1 month) as compared to historical charging event occurrences (e.g., that may have occurred prior to the past 1 month). For example, if the user has charged the vehicle 202a four times in the past 1 month at the charging station location 305a, and two times prior to the past 1 month, the processor 210 may determine the charging event occurrence frequency for the charging station location 305a as five (and not six). In this case, the processor 210 may a weight of "1" to charging event occurrences in the past 1 month, and a weight of "0.5" to the charging event occurrences prior to the past 1 month. In some aspects, the weights associated with the predefined time durations may be pre-stored in the memory 212. A person ordinarily skilled in the art may appreciate that the weights described herein are exemplary in nature, and should not be construed as limiting the present disclosure scope.

In some aspects, the processor 210 may determine the count of charging events based on the timestamps associated with the charging actions obtained from the vehicle 202a, and/or types of charging actions. For example, the processor 210 may identify a "pair" of charging start and stop actions (having same geolocation and difference in associated timestamps greater than a predefined charging threshold) as a single charging event. As another example, two charging start actions having a difference between associated timestamps greater than a predefined timestamp threshold may be identified as two separate charging events by the processor 210.

Responsive to determining the charging event occurrence frequencies for the charging station locations 305a-f, the processor 210 may send the determined charging event occurrence frequencies to the memory 212 for storage purpose. Further, the processor 210 may classify the charging station locations 305a-f into different classifications based on the determined charging event occurrence frequencies, as described below.

The processor 210 may use the instructions stored in the classification module 222 and classify the charging station locations 305a-f into a plurality of classifications including, but not limited to, "routine" charging station locations, a "primary" charging station location, "nearby" charging station locations, "short trip" charging locations, "long trip" charging locations, etc. In an exemplary aspect, the "routine" charging station locations may have associated charging event occurrence frequencies greater than a predefined routine threshold (e.g., in a range of 4-8 instances in past 1 or 2 months). In this case, the predefined routine threshold may be pre-stored in the memory 212, and the processor 210 may fetch the predefined routine threshold from the memory 212 to classify the charging station locations 305a-f.

In further aspects, the processor 210 may classify a charging station location from the "routine" charging station locations having a maximum charging event occurrence frequency as the "primary" charging station location. The "primary" charging station location may indicate a charging station location where the user may have historically charged the vehicle 202a the most number of times. In the FIGS. 3A and 3B, the "primary" charging station location is depicted as the charging station location 305a, and the "routine" charging station locations are depicted as the charging station locations 305b and 305c.

Responsive to classifying one or more charging station locations as "primary" and "routine", the processor 210 may define a virtual polygon 310 (or a polygonal vector) connecting the primary and the routine charging station locations on the map of the geographical area 300, as depicted in FIG. 3A. For example, as shown in FIG. 3A, the processor 210 may define a first virtual triangle 310 (or a triangular vector) connecting the charging station locations 305a, 305b, and 305c. Area within the first virtual triangle 310 may denote a "daily driving area" associated with the vehicle 202a user. Stated another way, the area within the first virtual triangle 310 may denote an area where the vehicle 202a user may frequently or mostly drive (and hence charge) the vehicle 202a. Defining the first virtual triangle 310 may enable the processor 210 to classify the charging station locations as "nearby", "short trip" and "long trip" charging station locations, which in turn may enable the processor 210 to provide EV charging recommendations to the server (s) 204, as described below.

Responsive to defining the first virtual triangle 310 on the map of the geographical area 300, the processor 210 may classify the charging station locations located within the first virtual triangle 310 as "nearby" charging station locations. For example, the processor 210 may classify the charging station locations 305d and 305e as "nearby" charging station locations. In an exemplary aspect, a "nearby" charging station location may denote a charging station location that may be within the daily driving area associated with the vehicle 202a user, however the user may use the "nearby" charging station location seldom to charge the vehicle 202a.

Furthermore, responsive to defining the first virtual triangle 310 on the map of the geographical area 300, the processor 210 may add a predefined virtual distance buffer to each first virtual triangle 310 edge and define a second virtual triangle 315 (or a second virtual polygon), as shown in FIG. 3A. In an exemplary aspect, the predefined virtual distance buffer may vary based on a first virtual triangle 310 area, such that a second virtual triangle 315 area may be in a range of 1.5 to 5 times the first virtual triangle 310 area. In some aspects, the processor 210 may calculate the predefined virtual distance buffer based on the first virtual triangle 310 area and a preset ratio (that may be pre-stored in the memory 212) of the second virtual triangle 315 area with the first virtual triangle 310 area.

In an exemplary aspect, area within the second virtual triangle 315 and outside of the first virtual triangle 310 on the map of the geographical area 300 may denote a "short trip driving area" associated with the vehicle 202a user. The processor 210 may classify the charging station locations located in the short trip driving area as short trip charging station locations. For example, the processor 210 may classify the charging station location 305f as a short trip charging station location. Further, the processor 210 may classify the charging station locations located outside the second virtual triangle 315 as long trip charging station locations. For example, the processor 210 may classify the charging station location 305g as a long trip charging station location. A short trip charging station location may indicate a charging station location where the user may charge the vehicle 202a when the user travels on a short trip (from the daily driving area) using the vehicle 202a. Similarly, a long trip charging station location may indicate a charging station location where the user may charge the vehicle 202a when the user travels on a long trip (from the daily driving area) using the vehicle 202a.

In a similar manner, the processor 210 may define first and second virtual polygons, and classify charging station locations into different classifications, for a plurality of vehicles (e.g., the vehicles 202a, 202b, 202c) over a predefined time duration. The processor 210 may further transmit EV charging recommendations to the server(s) 204 based on the defined first and second virtual polygons. Specifically, the processor 210 may determine daily driving areas (e.g., the first virtual polygon 310) and short trip driving areas (e.g., the second virtual polygon 315) for each of the plurality of vehicles, and may transmit EV charging recommendations to the server(s) 204 based on the primary charging station locations, routine charging station locations, nearby charging station locations, short trip charging station locations and long trip charging station locations associated with the plurality of vehicles.

For example, if a charging station (e.g., the charging station location 305d) is classified as "nearby" charging station location for the plurality of vehicles, the processor 210 may determine that although the charging station location 305d may be within the daily driving areas associated with users of the plurality of vehicles, the users may not be using the charging station location 305d often to charge their vehicles. In this case, the processor 210 may transmit a recommendation to the server(s) 204 (and hence to the entities associated with the server(s) 204) to provide incentives to the users to use the charging station location 305d. The incentives may be, for example, discount coupons, subscription, coupons to facilities (e.g., coffee shops, restaurants, etc.) located in proximity to the charging station location 305d, and/or the like.

As another example, if a charging station (e.g., the charging station location 305g) may be used by a plurality of vehicles on long trips to charge the vehicles, the processor 210 may transmit a recommendation to the server(s) 204 (and hence to the entities associated with the server(s) 204) to build new EV charging infrastructure a predefined distance from the charging station location 305g to maximize probability of new EV charging infrastructure usage.

In additional aspects, the processor 210 may transmit an EV charging recommendation to the server(s) 204 based on the charging station locations and time durations users typically spend on charging their vehicles at the charging station locations. For example, if users typically spend more time duration charging their vehicles at the charging station location 305c than the charging station location 305b, the processor 210 may transmit a recommendation to the server (s) 204 indicating that new EV charging infrastructure may be built in proximity to the charging station location 305c (thus casing load at the charging station location 305c). As another example, the processor 210 may transmit a recommendation to the server(s) 204 indicating that coupons for facilities (e.g., coffee shops, restaurants, etc.) located in proximity to the charging station location 305c may be provided to the users.

Although the description above describes an aspect where the processor 210 defines virtual triangles (e.g., the first virtual triangle 310 and the second virtual triangle 315) to classify the charging station locations, the present disclosure is not limited to the polygon being a triangle. Further, the present disclosure is not limited to the processor 210 defining a polygon to classify the charging station locations. FIG. 3B depicts another aspect of the present disclosure, where the processor 210 defines circles (shown as a first circle 320a, a second circle 320b, and a third circle 320c) of a predefined radius (that may be pre-stored in the memory 212) around the "primary" and "routine" charging station locations. A charging station location (e.g., the charging station location 305d) that may be located within the defined circles may be classified as "nearby" charging station location, and a charging station location (e.g., the charging station location 305g) that be located outside the defined circles may be classified as "trip" charging station location.

In this aspect, the processor 210 may not classify the charging station locations as short trip or long trip charging station locations.

FIG. 4 depicts a flow diagram of an example EV charging recommendation method 400 in accordance with the present disclosure. FIG. 4 may be described with continued reference to prior figures, including FIGS. 1, 2, 3A and 3B. The following process is exemplary and not confined to the steps described hereafter. Moreover, alternative embodiments may include more or less steps that are shown or described herein and may include these steps in a different order than the order described in the following example embodiments.

The method 400 starts at step 402. At step 404, the method 400 may include obtaining, by the processor 210, information associated with a plurality of charging events for the vehicle 202a. As described above, the processor 210 may obtain information associated with charging alerts or actions associated with the vehicle 202a, and may "stitch" together the actions to identify one or more separate charging events associated with the vehicle 202a. The information associated with the charging events may include charging event time durations and charging event geolocations, as described above.

At step 406, the method 400 may include generating, by the processor 210, a plurality of charging geolocation clusters 305a-f based on the charging event geolocations. At step 408, the method 400 may include determining, by the processor 210, a charging event occurrence frequency for each charging geolocation cluster 305a-f. As described above, the processor 210 may determine the charging event occurrence frequency based on a linear or a weighted count of charging events that may have occurred at each charging geolocation cluster 305a-f over a predefined time duration.

At step 410, the method 400 may include classifying, by the processor 210, a first charging geolocation cluster (e.g., the charging station location 305a) as the "primary" charging station location, and a plurality of second charging geolocation clusters (the charging station locations 305b and 305c) as the "routine" charging station locations based on the charging event occurrence frequencies, as described above.

At step 412, the method 400 may include defining, by the processor 210, a virtual polygon (e.g., the first virtual triangle 310) connecting the primary charging station location and the routine charging station locations. At step 414, the method 400 may include transmitting, by the processor 210, an electric vehicle charging recommendation to the server(s) 204 based on the defined virtual polygon. As described above, the electric vehicle charging recommendation may be associated with charging station infrastructure creation recommendation and/or a vehicle user incentive recommendation.

At step 416, the method 400 may end.

In some aspects, the method 400 may include additional steps (not shown in FIG. 4) of defining another virtual polygon (e.g., the second virtual polygon 315) by adding a predefined virtual distance buffer to each first virtual triangle 310 edge, as described above. The processor 210 may classify the charging station locations as short trip or long trip charging station locations based on the second virtual polygon 315, as described in conjunction with FIG. 2. The processor 210 may further classify one or more charging station locations as nearby charging station locations, when the charging station locations are located within the first virtual triangle 310.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for providing an electric vehicle charging recommendation, the method comprising:

obtaining, by a processor, information associated with a plurality of charging events for a vehicle, wherein the information comprises a plurality of vehicle geolocations associated with the plurality of charging events;

generating, by the processor, a plurality of charging geolocation clusters from the plurality of vehicle geolocations, wherein the plurality of charging geolocation clusters correspond to a plurality of charging station locations at which the vehicle has been charged;

determining, by the processor, a charging event occurrence frequency for each charging geolocation cluster based on the information, wherein the charging event occurrence frequency corresponds to a number of times the vehicle has been charged at the respective charging geolocation cluster;

classifying, by the processor, a first charging geolocation cluster from the plurality of charging geolocation clusters as a primary charging station location, and a plurality of second charging geolocation clusters from the plurality of charging geolocation clusters as routine charging station locations based on the charging event occurrence frequencies;

defining, by the processor, a virtual polygon connecting the primary charging station location and the routine charging station locations on a map of a geographical area;

determining, by the processor, the electric vehicle charging recommendation based on the virtual polygon;

transmitting, by the processor, the electric vehicle charging recommendation to a server; and autonomously, based on the electric vehicle charging recommendation and the virtual polygon, operating the vehicle.

2. The method of claim 1, wherein the routine charging station locations have routine charging event occurrence frequencies greater than a predefined threshold.

3. The method of claim 2, wherein classifying the first charging geolocation cluster from the plurality of charging geolocation clusters as the primary charging station location comprises:

identifying a first routine charging station location from the routine charging station locations, wherein the first routine charging station has a maximum charging event occurrence frequency of the charging event occurrence frequencies for the routine charging station locations; and classifying the first routine charging station location as the primary charging station location.

4. The method of claim 1, wherein the information further comprises a plurality of timestamps associated with the plurality of charging events.

5. The method of claim 4, further comprising:

assigning a weight to each charging event based on the timestamps; and determining the charging event occurrence frequency based on the weights.

6. The method of claim 1, wherein generating the plurality of charging geolocation clusters from the plurality of vehicle geolocations comprises generating the plurality of charging geolocation clusters based on distances of the plurality of vehicle geolocations from each other.

7. The method of claim 1, wherein the plurality of charging events comprises at least one of: a vehicle key-on event, a vehicle key-off event, a vehicle charging start event, and a vehicle charging end event.

8. The method of claim 7, wherein the information further comprises a time duration between the vehicle charging start event and the vehicle charging end event.

9. The method of claim 8, wherein determining the electric vehicle charging recommendation based on the virtual polygon comprises determining the electric vehicle charging recommendation based on the virtual polygon and the time duration.

10. The method of claim 1, wherein the electric vehicle charging recommendation comprises at least one of a charging station infrastructure creation recommendation, and a charging station incentive recommendation.

11. The method of claim 1, further comprising classifying one or more third charging geolocation clusters from the plurality of charging geolocation clusters located within the virtual polygon as nearby charging station locations.

12. The method of claim 11, further comprising:

classifying one or more fourth charging geolocation clusters from the plurality of charging geolocation clusters located less than a predefined virtual distance from a virtual polygon edge as short trip charging station locations; and classifying one or more fifth charging geolocation clusters from the plurality of charging geolocation clusters located more than the predefined virtual distance from the virtual polygon edge as long trip charging station locations.

13. The method of claim 12, wherein determining the electric vehicle charging recommendation based on the virtual polygon comprises determining the electric vehicle charging recommendation based on the virtual polygon, the short trip charging station locations, and the long trip charging station locations.

14. A system for providing an electric vehicle charging recommendation, the system comprising:

a transceiver configured to receive information associated with a plurality of charging events for a vehicle, wherein the information comprises a plurality of vehicle geolocations associated with the plurality of charging events;

a processor communicatively coupled to the transceiver; and a memory for storing executable instructions, the processor configured to execute the instructions to:

obtain the information from the transceiver;

generate a plurality of charging geolocation clusters from the plurality of vehicle geolocations, wherein the plurality of charging geolocation clusters correspond to a plurality of charging station locations at which the vehicle has been charged;

determine a charging event occurrence frequency for each charging geolocation cluster based on the information, wherein the charging event occurrence frequency corresponds to a number of times the vehicle has been charged at the respective charging geolocation cluster;

classify a first charging geolocation cluster from the plurality of charging geolocation clusters as a primary charging station location, and a plurality of second charging geolocation clusters from the plurality of charging geolocation clusters as routine charging station locations based on the charging event occurrence frequencies;

define a virtual polygon connecting the primary charging station location and the routine charging station locations on a map of a geographical area;

determine the electric vehicle charging recommendation based on the virtual polygon;

transmit the electric vehicle charging recommendation to a server; and autonomously, based on the electric vehicle charging recommendation and the virtual polygon, operate the vehicle.

15. The system of claim 14, wherein the routine charging station locations have routine charging event occurrence frequencies greater than a predefined threshold.

16. The system of claim 15, wherein the processor is configured to classify the first charging geolocation cluster from the plurality of charging geolocation clusters as the primary charging station location by:

identifying a first routine charging station location from the routine charging station locations, wherein the first routine charging station location has a maximum charging event occurrence frequency of the charging event occurrence frequencies for the routine charging station locations; and classifying the first routine charging station location as the primary charging station location.

17. The system of claim 14, wherein the processor is further configured to classify one or more third charging geolocation clusters from the plurality of charging geolocation clusters located within the virtual polygon as nearby charging station locations.

18. The system of claim 17, wherein the processor is further configured to:

classify one or more fourth charging geolocation clusters from the plurality of charging geolocation clusters located less than a predefined virtual distance from a virtual polygon edge as short trip charging station locations; and classify one or more fifth charging geolocation clusters from the plurality of charging geolocation clusters located more than the predefined virtual distance from the virtual polygon edge as long trip charging station locations, wherein the processor determines the electric vehicle charging recommendation based on the virtual polygon, the short trip charging station locations, and the long trip charging station locations.

19. The system of claim 14, wherein the electric vehicle charging recommendation comprises at least one of a charging station infrastructure creation recommendation, and a charging station incentive recommendation.

20. A non-transitory computer-readable storage medium having instructions stored thereupon which, when executed by a processor, cause the processor to:

obtain information associated with a plurality of charging events for a vehicle, wherein the information comprises a plurality of vehicle geolocations associated with the plurality of charging events;

generate a plurality of charging geolocation clusters from the plurality of vehicle geolocations, wherein the plurality of charging geolocation clusters correspond to a plurality of charging station locations at which the vehicle has been charged;

determine a charging event occurrence frequency for each charging geolocation cluster based on the information, wherein the charging event occurrence frequency corresponds to a number of times the vehicle has been charged at the respective charging geolocation cluster;

classify a first charging geolocation cluster from the plurality of charging geolocation clusters as a primary charging station location, and a plurality of second charging geolocation clusters from the plurality of charging geolocation clusters as routine charging station locations based on the charging event occurrence frequencies;

define a virtual polygon connecting the primary charging station location and the routine charging station locations on a map of a geographical area;

determine an electric vehicle charging recommendation based on the virtual polygon;

transmit the electric vehicle charging recommendation to a server based on the virtual polygon; and autonomously, based on the electric vehicle charging recommendation and the virtual polygon, operate the vehicle.

* * * * *